United States Patent [19]
Spielmann et al.

[11] Patent Number: 4,592,438
[45] Date of Patent: * Jun. 3, 1986

[54] MOUNTING FOR POWER-ASSISTED MASTER BRAKE CYLINDER IN AN AUTOMOTIVE VEHICLE

[75] Inventors: Norbert Spielmann; Udo Güssbacher, both of Ebern; Wolfgang Walter, Schorkendorf; Hermann Bauer, Lülsfeld; Rainer Porzel, Ebern, all of Fed. Rep. of Germany

[73] Assignee: Fag Kugelfischer Georg Schafer & Co., Schweinfurt, Fed. Rep. of Germany

[ * ] Notice: The portion of the term of this patent subsequent to Jun. 19, 2001 has been disclaimed.

[21] Appl. No.: 463,048

[22] Filed: Feb. 1, 1983

[30] Foreign Application Priority Data

Feb. 3, 1982 [DE] Fed. Rep. of Germany ....... 3203495

[51] Int. Cl.⁴ .................. B62D 23/00; B60T 13/00
[52] U.S. Cl. .................... 180/89.1; 60/533; 60/547.1
[58] Field of Search ............... 92/169.1, 169.2, 169.3, 92/169.4; 60/547.1, 533; 220/322, 324, 326; 403/392; 206/805, 335, 318, 319; 248/499; 180/89.1

[56] References Cited

U.S. PATENT DOCUMENTS

| | | | |
|---|---|---|---|
| 1,284,404 | 11/1918 | Mannschmidt | 220/322 |
| 2,213,738 | 9/1940 | Larsen | 248/499 |
| 3,416,759 | 12/1968 | Arnett | 248/499 |
| 3,858,272 | 1/1975 | Bard et al. | 220/322 |
| 4,246,755 | 1/1981 | Weiler | 60/547.1 |
| 4,271,570 | 6/1981 | Thomas et al. | 92/169 |

FOREIGN PATENT DOCUMENTS

| | | | |
|---|---|---|---|
| 723514 | 12/1965 | Canada | 60/547.1 |
| 2845794 | 4/1979 | Fed. Rep. of Germany . | |
| 2814372 | 10/1979 | Fed. Rep. of Germany . | |
| 2830262 | 1/1980 | Fed. Rep. of Germany . | |

*Primary Examiner*—Abraham Hershkovitz
*Attorney, Agent, or Firm*—Karl F. Ross; Herbert Dubno

[57] ABSTRACT

An assembly of a master brake cylinder and an associated power cylinder of larger diameter, disposed in front of the dashboard, is held together under tension by a stirrup-shaped retainer with a bight embracing the free end of the master cylinder and two legs anchored to the dashboard, these legs traversing the power cylinder. A roll membrane inside the power cylinder, forming a flexible partition that divides its interior into two chambers between which a pressure difference is developed to operate the master cylinder, has cuffs attached to two guide tubes rigid with at least one wall of the power cylinder, these tubes being traversed by the retainer legs.

12 Claims, 7 Drawing Figures

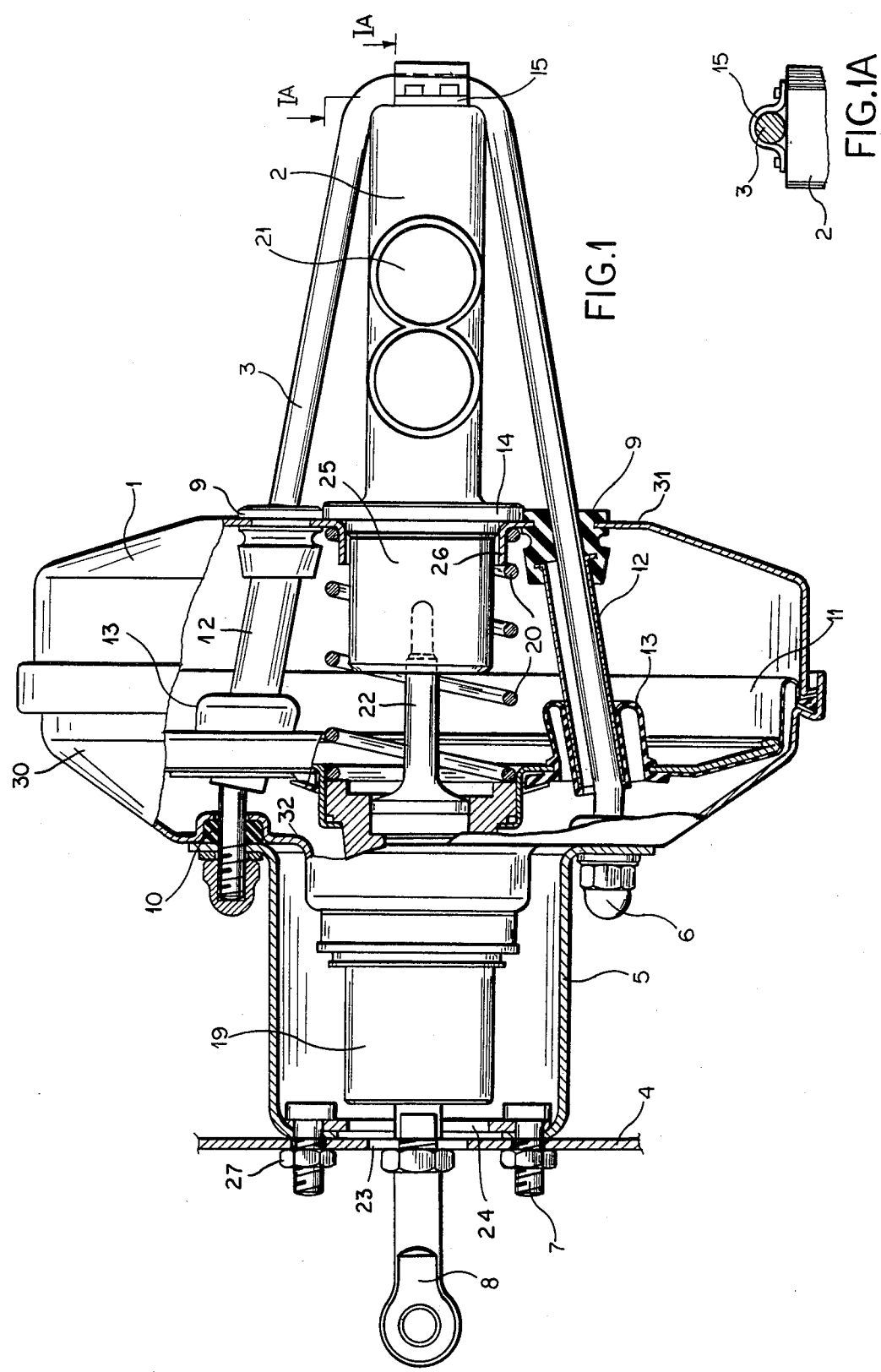

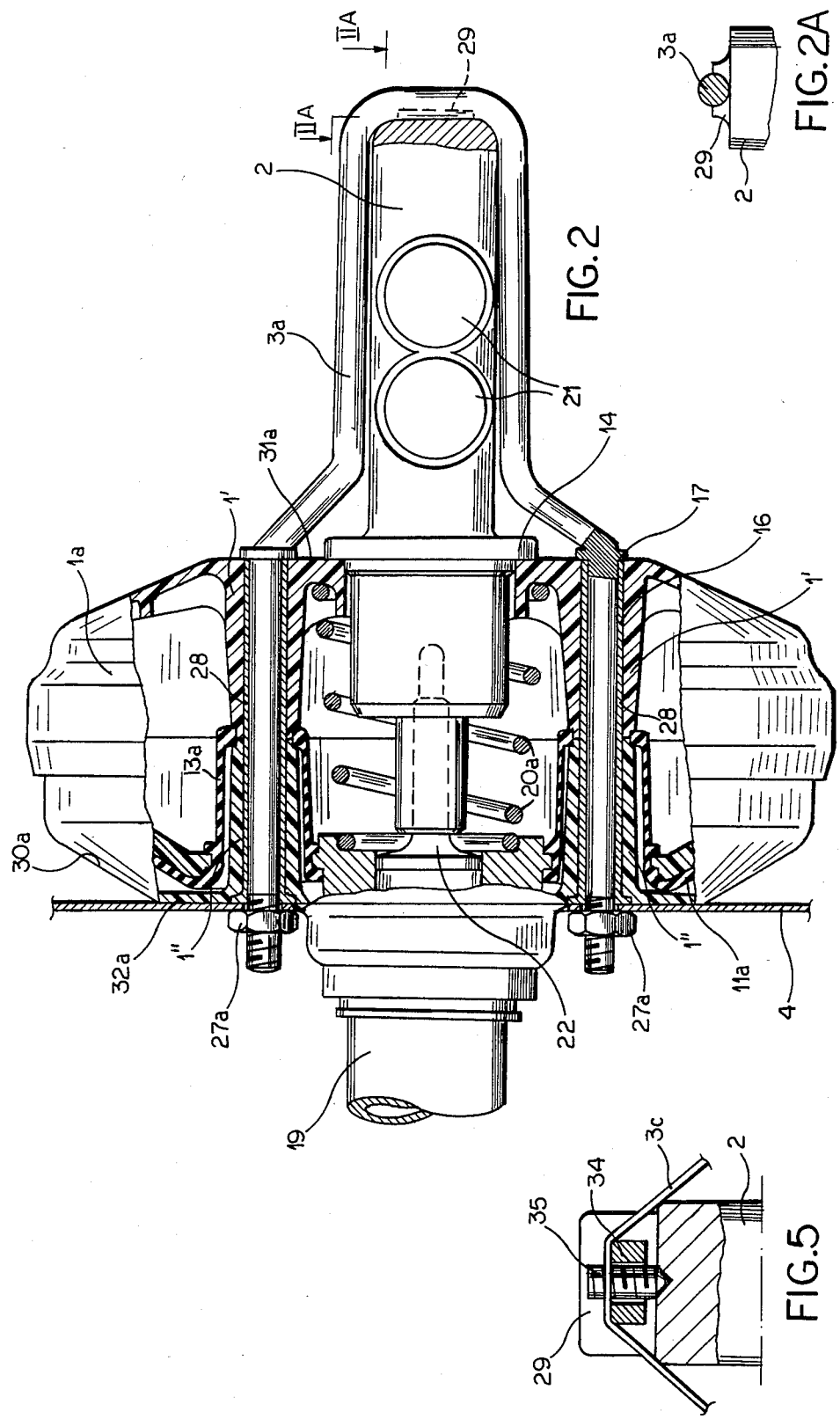

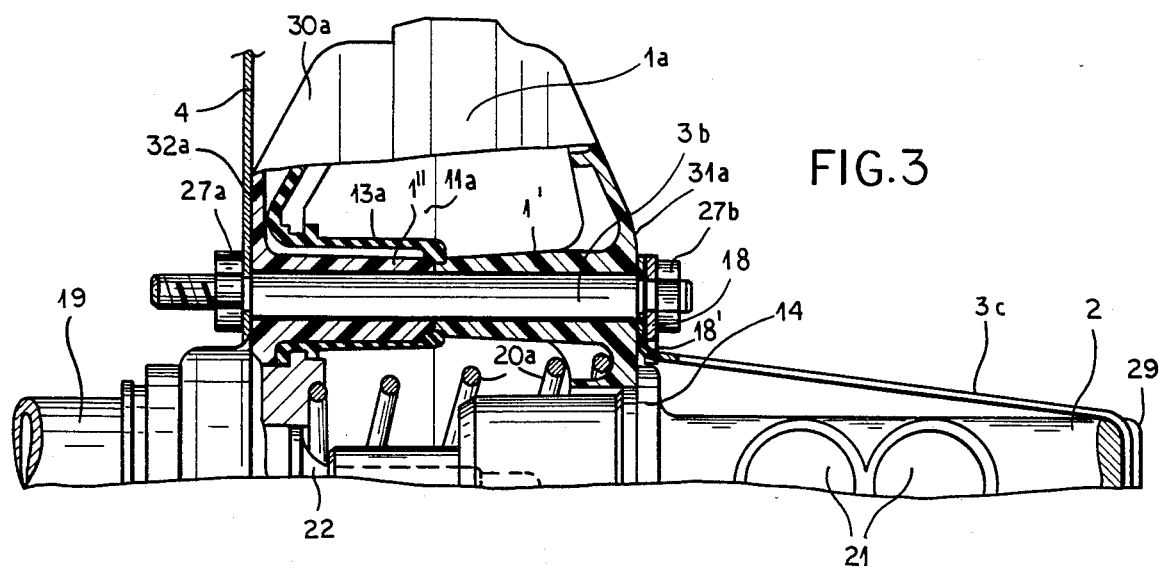
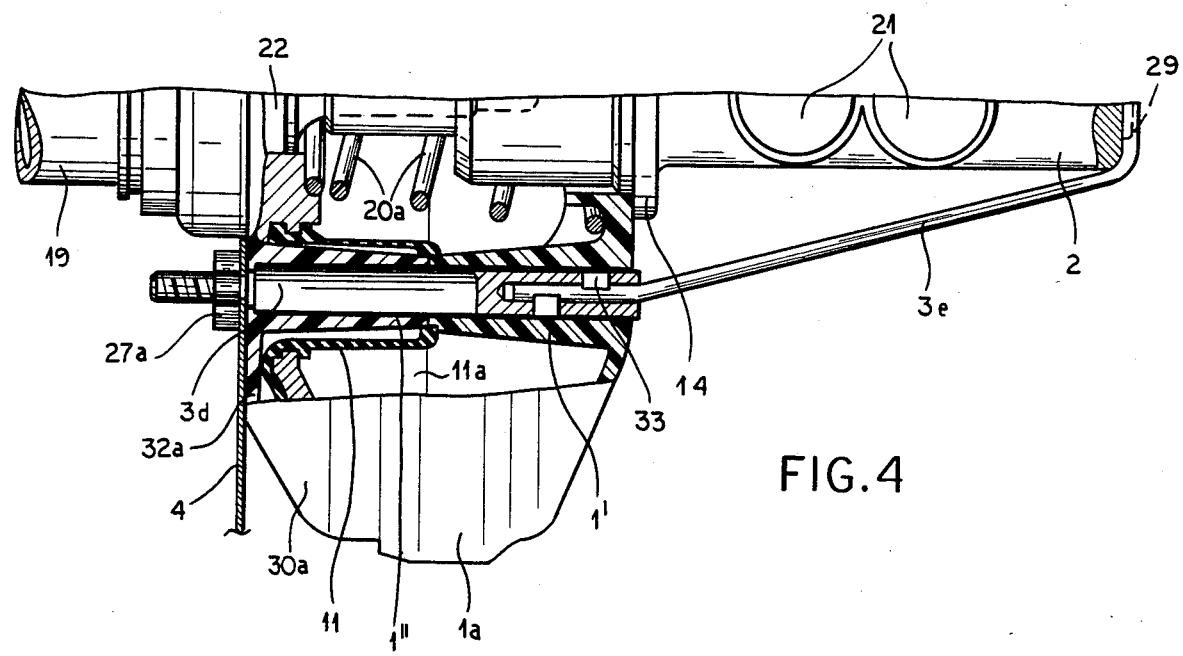

MOUNTING FOR POWER-ASSISTED MASTER BRAKE CYLINDER IN AN AUTOMOTIVE VEHICLE

FIELD OF THE INVENTION

Our present invention relates to a mounting for a power-assisted master cylinder of a hydraulic brake system supported in an engine compartment of an automotive vehicle on a dashboard separating that compartment from the interior of the vehicle, i.e. from the driver's position.

BACKGROUND OF THE INVENTION

In such a brake system it is customary to mount a power cylinder on the front side of the dashboard, i.e. within the engine compartment, and to let a hub thereof extend through an aperture in the dashboard in order to facilitate the linking of a control valve in the power cylinder with a brake pedal on the driver's side; see, for example, U.S. Pat. No. 3,222,868. With the power cylinder split into a lid or header adjoining the dashboard and a body or base remote therefrom, the master cylinder of the hydraulic brake system—which is generally of smaller diameter than the power cylinder—can be coaxially attached to that base. It has already been proposed to envelop the two parts of the power cylinder in a basket-like holder with a central flange supporting the master cylinder at its end proximal to the power cylinder, that holder having struts which are bent in axial planes around the periphery of the power cylinder and are anchored to the dashboard; see German laid-open specification No. 28 14 372. The purpose of this holder is to prevent an axial expansion of the power cylinder, in response to a brake-operating pressure applied to the piston of the master cylinder, and thus to avoid a significant displacement of the latter cylinder relative to the dashboard.

In order to achieve this purpose, both the holder and the master cylinder must be made of rigid and correspondingly heavy material designed to withstand the applied braking pressure as reinforced in the power cylinder. Since the holder is not readily adjustable, it must be adapted to the contour of the power cylinder with close tolerances to obviate undesirable variations in the pedal stroke.

It is known, e.g. from German laid-open specifications Nos. 28 30 262 and 28 45 794, to provide a power cylinder of an automotive brake system with at least two axially extending rods anchored to its front and rear walls in order to stabilize their positions, these rods passing through the interior of the power cylinder and penetrating a flexible partition—termed a roll membrane—which divides that interior into two differentially pressurizable chambers. Threaded ends of these rods, projecting from the power cylinder, may serve to fasten its rear wall to the vehicular dashboard and its front wall to the associated master cylinder.

In commonly owned application Ser. No. 462,774 filed by us concurrently with the present application, there has been disclosed and claimed a flexible retainer which embraces the master cylinder and at least part of the periphery of the power cylinder under tension for holding same in position, this retainer passing around a free end of the master cylinder; the retainer, which may be a wire or cable but preferably is designed as a strap, advantageously has extremities that are anchored to the dashboard at opposite sides of an aperture traversed by a hub-shaped extension of the power cylinder. The retainer may be provided with adjustable braking means, interposed between a bight thereof and the free end of the master cylinder, for varying its tension and, if necessary, relaxing it sufficiently to detach its bight from the master cylinder so as to facilitate the removal of the latter from the power cylinder.

OBJECTS OF THE INVENTION

The general object of our present invention, like that of the commonly owned application referred to, is to provide an improved mounting for the combination of such a master cylinder with an associated power cylinder which can be conveniently fitted to an existing structure, reduces the stress exerted upon the master cylinder and can be simply and inexpensively produced.

A more particular object is to provide a mounting of this character which has a certain degree of adjustability to accommodate assemblies of different dimensions.

SUMMARY OF THE INVENTION

Such a mounting, pursuant to our present invention, comprises a generally stirrup-shaped retainer in the engine compartment with a bight embracing the free end of the master cylinder remote from the power cylinder and with a pair of legs traversing the latter cylinder, these legs being detachably anchored to the dashboard—directly or through the intermediary of a rearward extension of the front wall of the power cylinder—for holding the two cylinders in position.

With this type of retainer, as with that of the commonly owned application, the master cylinder need not be fixedly secured to the power cylinder but can be slidably interfitted therewith so as to be readily removable, upon a loosening or detachment of the retainer, to make either cylinder accessible for inspection or repair. The tension of the retainer as well as its effective length can be varied with the aid of adjustable stressing means, in order to accommodate cylinder assemblies of slightly differing axial dimensions or to facilitate disassembly as noted above, which could be constituted by fasteners (e.g. cap nuts) serving to attach the rear ends of the retainer legs to the dashboard or to the aforementioned rearward extension of the power cylinder. Especially when the part of the retainer embracing the master cylinder is a flexible member such as a wire or a strap, stressing or relaxation of the retainer could also be controlled by a bracing device interposed between the free cylinder end and the retainer bight.

BRIEF DESCRIPTION OF THE DRAWING

The above and other features of our invention will now be described in detail with reference to the accompanying drawing in which:

FIG. 1 is a top view of an assembly of master cylinder, power cylinder and retainer according to our invention;

FIG. 1A is a detail view taken on the line 1A—1A of FIG. 1;

FIG. 2 is a view similar to that of FIG. 1, illustrating another embodiment;

FIG. 2A is a detail view taken on the line 2A—2A of FIG. 2;

FIG. 3 is a top view of half of an assembly similar to those of FIGS. 1 and 2, representing a further modification;

FIG. 4 shows the other half of an assembly such as that illustrated in FIG. 3, but with some modifications; and FIG. 5 is a cross-sectional detail view of a bracing device usable with the assembly of FIG. 3.

SPECIFIC DESCRIPTION

In FIG. 1 we have shown the combination of a master cylinder 2 of a hydraulic brake system with an associated power cylinder having a body 1 and a lid 30 provided with respective end walls, namely a front wall 31 formed by body 1 and a rear wall 32 formed by lid 30. The two cylinders are coaxially interfitted and carried on the front side of a dashboard 4 of an automotive vehicle not further illustrated. The two parts 1, 30 of the power cylinder clamp between them a roll membrane 11, made partly of rubber of other deformable sheet material, which acts as a flexible partition or piston dividing the interior of this cylinder into two chambers that are fluidically separated from each other. Membrane 11 carries a plunger 22 which extends into the master cylinder 2 to pressurize same in response to a pressure differential developed across the membrane with the aid of nonillustrated valves as is well known per se. Thus, the cylinder may be a servomotor of the vacuum-operated type with suction normally applied uniformly to both chambers via a lowpressure connection to the manifold of the vehicular engine; its rear chamber (bounded by wall 32 and membrane 11) may be vented to the atmosphere upon the operation of a brake pedal by the driver of the vehicle, that pedal being linked with an actuator 8 which projects rearwardly from a hub 19 of lid 30 and traverses an aperture 23 of dashboard 4 as well as another aperture 24 of a cup-shaped rearward extension 5 of wall 32. Cup 5 is demountably secured to dashboard 4 by screws 7 and nuts 27. In the nonoperated position of the brake pedal, a powerful coil spring 20 keeps the membrane 11 repressed toward wall 32.

Master cylinder 2 is provided with a cap 21 overlying the usual filling openings for two cascaded sections thereof. A boss 25 of this cylinder is removably seated in a flange 26 of body 1 and has a shoulder 14 resting against that flange; a packing ring could be inserted therebetween.

In accordance with our present invention, a retainer 3 in the form of a stirrup-shaped rod of metal or plastic embraces the master cylinder 2 and has legs traversing the power cylinder 1, 30 as well as the membrane 11 thereof, these legs having threaded extremities which pass through aligned openings of rear wall 32 and of the rim of cup 5 to which they are secured by cap nuts 6. Wall 32 has pockets occupied by gaskets 10 of rubber or the like to form an airtight seal around these extremities. Cap nuts 6 could be provided with markings or stops limiting the tension to be applied to retainer 3. The legs of this retainer pass through the front wall 31 by slidably penetrating gaskets 9 sealingly fitting into openings of that wall; these gaskets 9 are further sealed to the front ends of respective guide tubes 12 which are traversed with clearance by the retainer legs and whose rear ends are sealingly engaged by cuffs 13 formed by membrane 11. The bight of retainer 3, reaching around the free end of master cylinder 2, is positively gripped at that end by a clamp 15 removaly attached to cylinder 2; see also FIG. 1A.

With this arrangement the two cylinders are firmly held in position and are restrained against axial expansion under fluid pressure so as to avoid any objectionable lengthening of the brake-pedal stroke. Their junction is also relieved of stress so that the material of cylinder body 1 need only be strong enough to sustain the partial vacuum present therein. Upon removal of the nuts 27, the entire assembly can be bodily detached from the dashboard 4. On the other hand, an unclamping of the bight of retainer 3 and a loosening of the cap nuts 6 will enable that retainer, thanks to some inherent flexibility and its yieldable mounting in gaskets 9 and 10, to be slipped off the free end of master cylinder 2 which can then be separated from power cylinder 1, 30.

In FIG. 2 we have shown a slightly modified power cylinder whose body 1a and lid 30a are provided with internal tubular bosses 1' and 1" respectively integral with front wall 31a and rear wall 32a. These axially extending bosses abut each other to form a guide tube for the legs of a retainer 3a; the legs are seen to have forward portions parallel to the axis of the assembly so as to hug the master cylinder 2 more closely than do corresponding portions of retainer 3 (FIG. 1). This, however, is not essential and the exposed part of retainer 3a could be made to converge toward its bight in a manner similar to that of the preceding embodiment. A roll membrane 11a inside the power cylinder has cuffs 13a which are sealed to the junctions of tube sections 1' and 1"; the ends of the cuffs could also be clamped between these tube sections as known per se from FIG. 11 of the aforementioned German laid-open specification No. 28 45 794. Within tubes 1', 1" the retainer legs are closely but slidably surrounded by rigid sleeves 28 abutting collars 17 integral with these legs which rest against the outer surface of cylinder wall 31a; the threaded rear extremities of the retainer legs, passing through aligned openings of wall 32a and the immediate adjoining dashboard 4, are engaged by nuts 27a clamping the dashboard against the ends of sleeves 28. A forward deflection of membrane 11a is resisted by a coil spring 20a which differs by its frustoconical configuration from the cylindrical coil spring 20 of FIG. 1.

The bight of retainer 3a is shown to be straddled by ridges 29 (see also FIG. 2A) rising from the free end of master cylinder 2, thus enabling a quicker detachment of the retainer from the master cylinder. It will, however, be evident that the clamp 15 of FIGS. 1 and 1A could likewise be used in this instance.

In FIGS. 3 and 4 we have shown a cylinder assembly virtually identical with that of FIG. 2 but wherein somewhat different retainers are being used. The retainer of FIG. 3 has rigid rod-shaped leg portions 3b (only one shown) which slidably traverse the guide-tube-forming bosses 1', 1" without interposition of a sleeve and have threaded front ends projecting from wall 31a, each of these ends being engaged by a nut 27b that bears upon a washer 18 serving to clamp an extremity of a flexible element 3c onto a shoulder of the respective leg portion 3b which is flush with wall 31a. The flexible element 3c is a strap, similar to that shown in the commonly owned application of even date referred to above, which reaches around the bight of cylinder 2 and is guided between ridges 29 thereof. Each washer 18 has a bifurcation 18' straddling the adjoining strap end in order to be held against rotation.

The retainer of FIG. 4 differs from that of FIG. 3 in that its rigid leg portions 3d (again only one shown) have front ends formed with bores in which a flexible element designed as a wire 3e is fixedly retained. The bight of wire 3e is also guided by ridges 29 rising from the free end of master cylinder 2. The connection between rod 3d and wire 3e is established by spikes 33 driven into the rod but could also be made by welding or soldering.

In FIG. 5 we have shown a bracing device, similar to that disclosed in the commonly owned application of even date, inserted between master cylinder 2 and the bight of a retainer, here a strap 3c as shown in FIG. 3. The device comprises a rectangular nut 34 slidably bracketed by ridges 29 (only one shown) and engaged by a pressure bolt 35 which projects through a hole in strap 3c and can be turned by an Allen wrench to vary the distance between the nut and the bottom of a diametrical groove defined by the ridges. If necessary, a counternut could be screwed onto the projecting end of bolt 35 to prevent accidental loosening of the strap. Analogous bracing means could also be used with the retainers of FIGS. 1, 2 and 4.

We claim:

1. In an automotive vehicle having an engine compartment separated by a dashboard from the interior of the vehicle, a power cylinder on the engine side of the dashboard having an actuator which traverses said dashboard and is linked with a brake pedal on a driver's side thereof, and a master brake cylinder of lesser diameter coaxially adjoining said power cylinder in the engine compartment, the combination therewith of a generally stirrup-shaped retainer in said engine compartment with a bight embracing a free end of said master brake cylinder remote from said power cylinder and with a pair of legs traversing said power cylinder, said legs extending parallel to said master brake cylinder while flanking same and being detachably anchored to said dashboard under tension for holding said cylinders in position.

2. The combination defined in claim 1 wherein said power cylinder has a rear wall proximal to said dashboard and a front wall adjacent said master brake cylinder, said legs being provided with fastening means securing same to said dash board.

3. The combination defined in claim 2 wherein said legs are anchored to said dashboard through the intermediary of a rearward extension of said rear wall.

4. The combination defined in claim 2 wherein said legs have threaded extremities traversing said dashboard, said fastening means comprising nuts threadedly engaging said extremities and holding said rear wall against said dashboard.

5. The combination defined in claim 2 wherein at least one of said walls is provided with a pair of guide tubes extending into the interior of said power cylinder, further comprising a roll membrane which divides said interior into two fluidically separated chambers and carries a plunger extending into said master brake cylinder, said roll membrane having cuffs secured to said guide tubes, said legs passing through said guide tubes and said cuffs.

6. The combination defined in claim 5 wherein said guide tubes each consist of two axially adjoining sections respectively integral with said front and rear walls, said cuffs being secured to said guide tubes at the junctions of said sections.

7. The combination defined in claim 2 wherein said master brake cylinder has a rear end slidably fitted into a central aperture of said front wall and a flange on said rear end bearing upon said front wall under pressure from said retainer.

8. The combination defined in claim 1 wherein said retainer is provided with adjustable stressing means for varying the tension thereof.

9. The combination defined in claim 1 wherein said retainer includes rigid leg portions traversing said power cylinder and a flexible element embracing said master brake cylinder.

10. The combination defined in claim 9 wherein said leg portions have ends remote from said dashboard projecting from a front wall of said power cylinder, said flexible element being attached to said projecting ends.

11. The combination defined in claim 9 wherein said free end has ridges bracketing said flexible element at said bight.

12. In an automotive vehicle having an engine compartment separated by a dashboard from the interior of the vehicle, a power cylinder on the engine side of the dashboard having an actuator which traverses said dashboard and is linked with a brake pedal on a driver's side thereof, and a master brake cylinder of lesser diameter coaxially adjoining said power cylinder in the engine compartment, the combination therewith of a generally stirrup-shaped retainer in said engine compartment with a bight embracing a free end of said master brake cylinder remote from said power cylinder and with a pair of legs traversing said power cylinder, said legs being detachably anchored to said dashboard under tension for holding said cylinders in position, said free end being provided with clamping means positively attaching said bight to said master brake cylinder.

* * * * *